United States Patent [19]

Silvon

[11] 3,962,929

[45] June 15, 1976

[54] DRIVE SPROCKET FOR CHAIN SAW

[75] Inventor: Kay Silvon, Portland, Oreg.

[73] Assignee: Omark Industries, Inc., Portland, Oreg.

[22] Filed: Nov. 24, 1972

[21] Appl. No.: 308,971

[52] U.S. Cl. .......... 74/243 CS

[51] Int. Cl.[2] .......... F16H 55/30

[58] Field of Search .......... 74/243 CS; 30/381, 383, 30/386

[56] References Cited

UNITED STATES PATENTS

| | | | |
|---|---|---|---|
| 3,144,890 | 8/1964 | Irgens | 74/243 CS |
| 3,279,272 | 10/1966 | Gudmundsen | 74/243 CS |
| 3,683,980 | 8/1972 | Gasner | 74/243 CS |

*Primary Examiner*—Samuel Scott
*Assistant Examiner*—Allan R. Burke
*Attorney, Agent, or Firm*—Robert L. Harrington

[57] ABSTRACT

A washer like metal blank formed into flutes. Each flute is shaped to receive the drive tangs of a saw chain so that successive drive tangs are alternately received in the flutes of first one side and then the other. The central opening is provided with keyways adapted to be mounted on a keyed hub.

2 Claims, 10 Drawing Figures

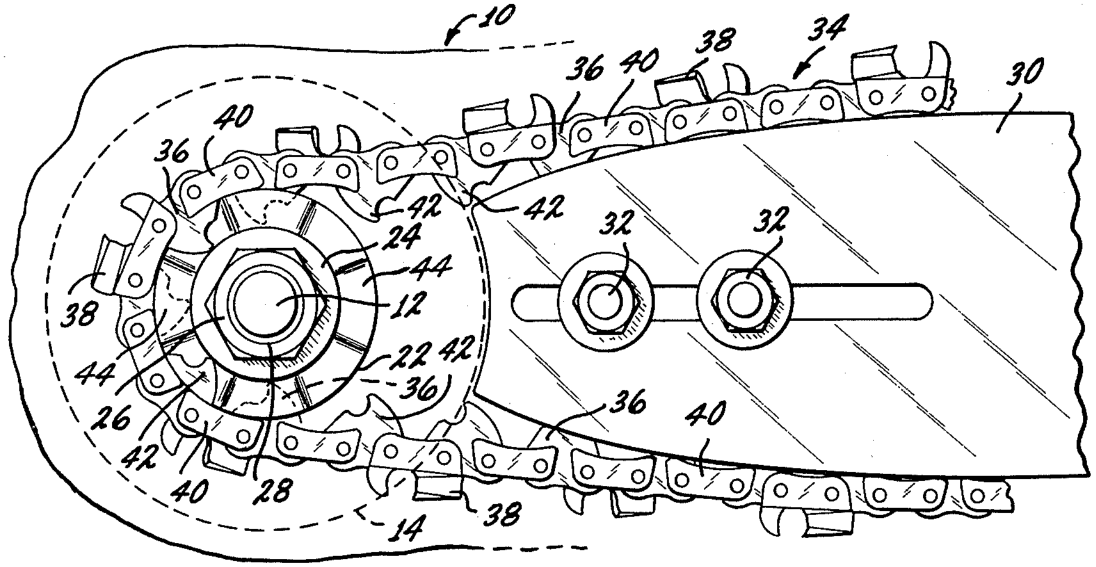
FIG. 1
FIG. 2
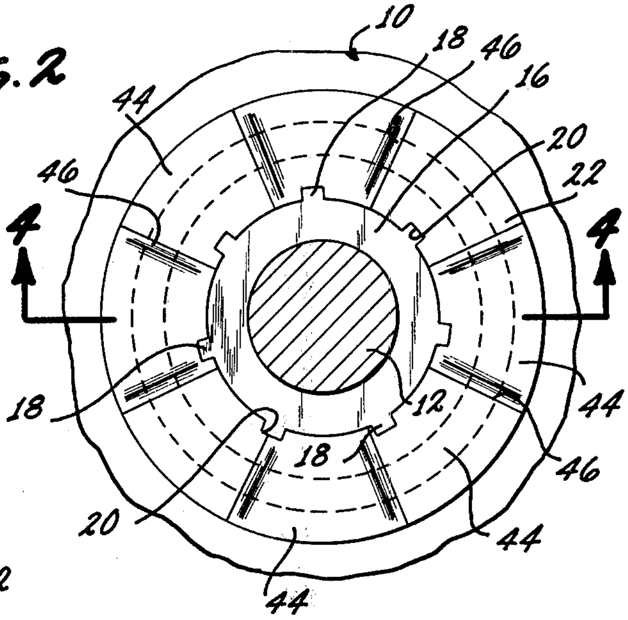
FIG. 4
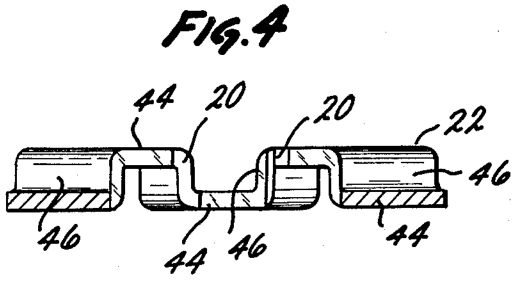
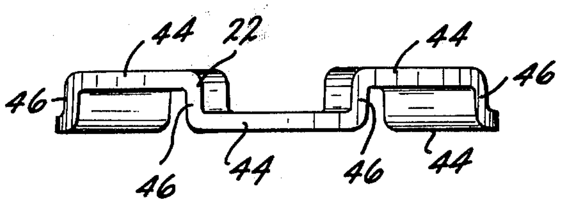
FIG. 5

DRIVE SPROCKET FOR CHAIN SAW

HISTORY

This invention relates to sprockets mounted to the drive shaft of a chain saw for driving saw chain around the guide bar of the chain saw. Irgens U.S. Pat. No. 3,144,890 discloses a sprocket that is self-aligning. This sprocket is accepted in the industry as having advantages over fixed sprockets. However, an off-setting disadvantage of the self-aligning sprocket has been the increased cost of manufacturing it as compared to the cost of manufacturing a fixed sprocket.

BRIEF DESCRIPTION

The present invention teaches a concept for sprockets and the manufacture thereof which is adaptable as a self-aligning sprocket but is produced at only a fraction of the cost of previous self-aligning sprockets. Very briefly, the preferred embodiment of the present invention is a washer like member having a single endless band of metal that is shaped so as to form radially alternating flutes. The edge around the center opening of the washer like member is notched and thus adapted to fit a driving member with male splines and having limited sliding movement thereon in accordance with the aforesaid Irgens patent.

The invention and its advantages will be more clearly understood by reference to the following detailed disclosure and drawings wherein:

FIG. 1 illustrates a sprocket of the present invention mounted on a chain saw;

FIG. 2 is an enlarged view illustrating the sprocket as shown in FIG. 1 but with chain saw parts removed;

FIG. 4 is a view taken on section lines 4—4 of FIG. 2;

FIG. 5 is an edge view of the sprocket of FIG. 4; and

FIGS. 6*a* – 6*e* are diagramatic illustrations of the manufacturing steps employed to fabricate the sprocket.

Figure 3:
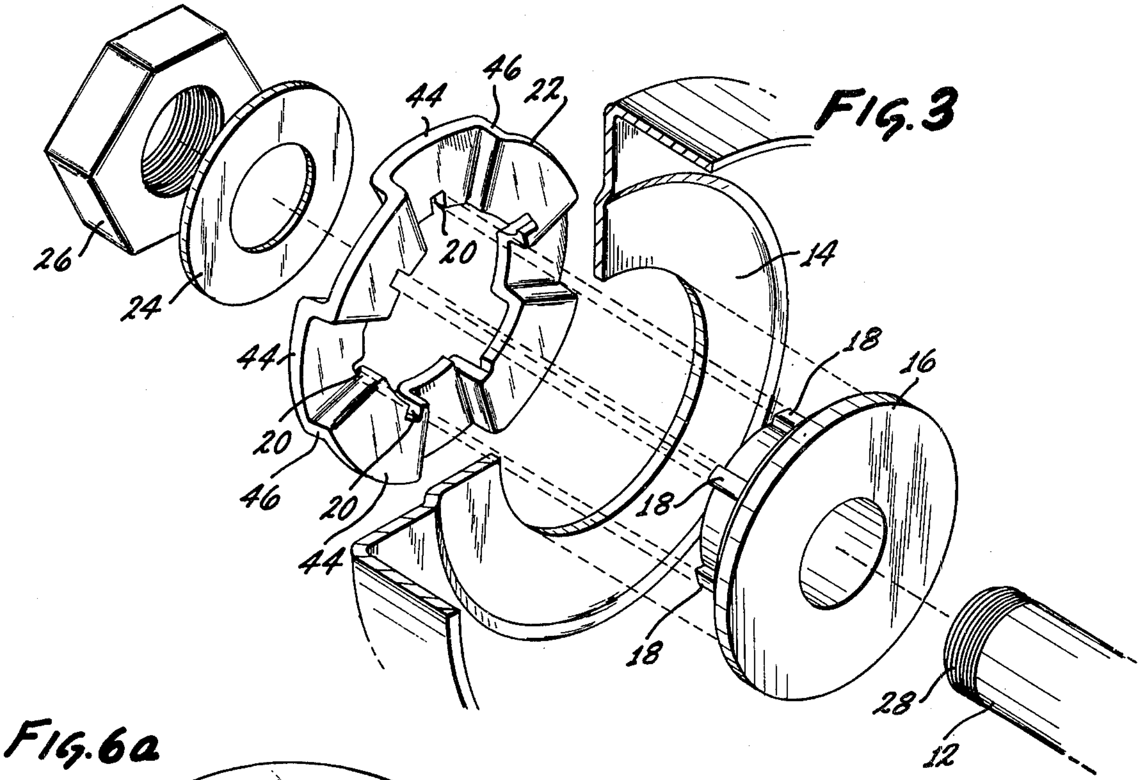
FIG. 3 is a perspective exploded view of the sprocket and the parts for assembling the sprocket to a chain saw.

Referring to the drawings, and particularly to FIGS. 1 and 3, a chain saw 10 includes a power head (not shown) which rotatively drives a drive shaft 12. A clutch drum 14 and hub member 16 are assembled (the hub being inserted through the opening of the clutch drum and brazed or welded or otherwise formed integrally as part of drum) and placed on the drive shaft 12. A centrifugal clutch functions to engage the clutch drum 14 with the drive shaft 12 in a manner well known to the art and is not shown. As shown, the hub member 16 has splines 18 adapted to fit notches 20 of a sprocket 22 which will be described in more detail hereafter. The sprocket is held on the hub member 16 by a washer 24 and threaded nut 26 which is screwed onto the threaded end 28 of the drive shaft 12.

It will be understood that the sprocket 22 is adapted to be driven by the hub 16 which, being fixed to the clutch drum, is driven by drive shaft 12 through the engagement of the centrifugal clutch. Referring now more specifically to FIG. 1, a saw chain guide bar 30 is mounted to the housing of the chain saw 10 by mounting screws 32. A saw chain 34 is comprised of center drive links 36, cutter links 38 and tie straps 40. Each center drive link includes an inwardly extending drive tang 42. These drive tangs 42 are adapted to slide in a groove formed in the edge of the saw chain guide bar 30 in a conventional manner. Thus, the saw chain 34 is mounted on the guide bar 30 and on the sprocket 22 which engages the drive tangs 42 of the center drive links 36 to drive the saw chain around the guide bar 30.

Referring now to all of the figures, the sprocket 22 is comprised of a single endless band of metal, e.g., a washer like member that is shaped into radiating flutes alternating from side to side. These flutes are shaped to form side walls 44 and connecting web segments 46. The side walls and web segments form three sided, open bottomed, open sided receiving chambers for receiving the drive tangs 42 of the drive links 36. The side walls 44 on one side of the sprocket limit the side movement of the chain in one direction while the opposite side walls 44 limit the side movement of the chain in the other direction. The connecting web segments provide the driving spokes of the sprocket.

Figure 6A:
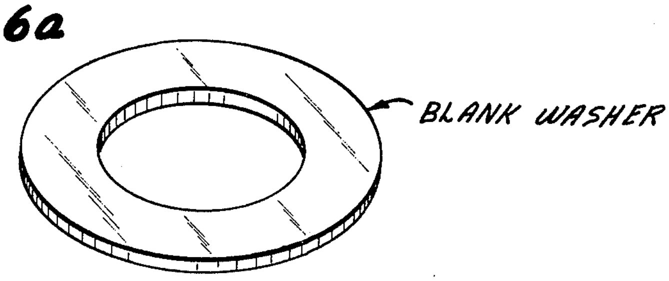
Figure 6B:
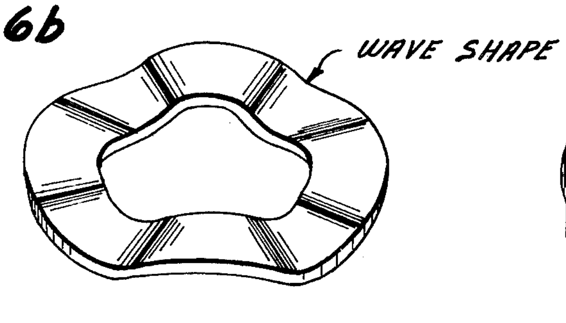
Figure 6D:
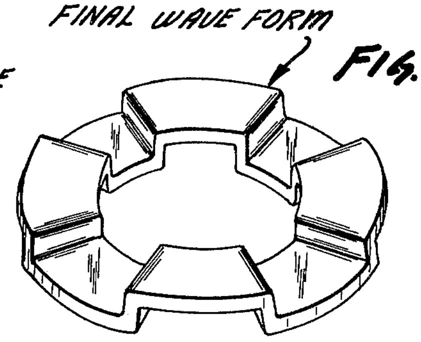
Figure 6C:
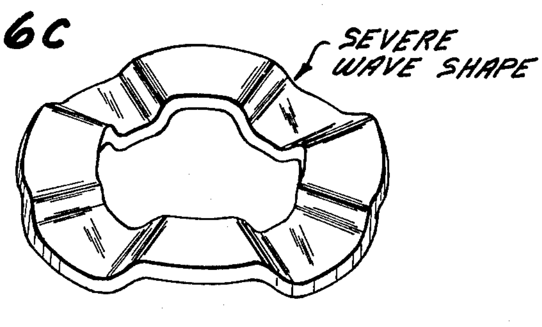
Figure 6E:
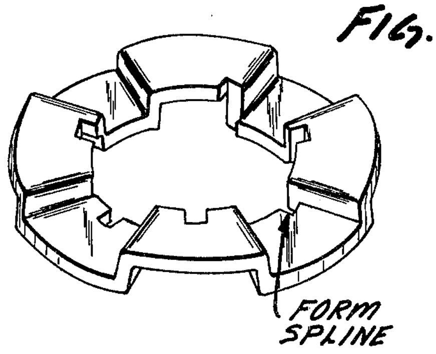

Whereas the sprocket of the present invention is easily fabricated at very little cost, it very adequately functions in the same manner as the sprocket of the Irgens disclosure, i.e., by providing the notches it is self-aligning on the hub as taught by Irgens. This fabrication of the sprocket is described in detail as follows:

Machinery that is commonly used for metal forming has been successfully used for forming sprockets of the present invention. FIGS. 6*a* – 6*e* illustrate the steps that are employed with such machinery for fabricating the sprocket. Referring to FIG. 6*a*, a washer like metal band is stamped from a sheet or strip of metal having an appropriate thickness and ductility which properties will vary by personal preference but are easily determined by those skilled in the art. The next step as illustrated in FIG. 6*b* is to bend the metal band into alternating radiating flutes. The height of the bends or flutes in this step is the full height to be realized in the finished product. The third step, illustrated in FIG. 6*c*, and the fourth step, FIG. 6*d*, are metal forming steps with the flutes being shaped to form the defined end and side walls of the receiving chambers. In FIG. 6*e*, the edge around the central opening is pierced to form the splines and then the sprocket is heat treated to achieve toughness and durability.

It will be understood that although the sprocket of the present invention is particularly adapted to the Irgens concept of self-alignment, there are numerous variations that can be made to adapt the sprocket of the present invention to other sprocket types while still deriving the cost saving advantage. For example, the sprocket can be fabricated as previously described without the notches and then brazed or welded directly onto a clutch drum, thus producing a very inexpensive fixed sprocket. Such a sprocket will be readily distinguished from sprockets produced by the costly method of casting, e.g., see Gudmundsen U.S. Pat. No. 3,279,272 and Gasner U.S. Pat. No. 3,683,980. Other variations will be obvious to those skilled in the art and the invention is thus not to be limited to the designs specifically described but is intended to be encompassed by the following claims.

What I claim is:

1. A drive sprocket for a saw chain which includes pairs of tie straps having bottom supporting surfaces and interconnected center drive links having depending drive tangs, said drive sprocket comprising; an integral washer like endless metal band with substantially uniform thickness having a circular central opening and a circular outer periphery, wave like flutes symmetrically formed into said metal band radiating outwardly from said central opening and being formed continuously from the inner edge of the band at the central opening to said outer periphery, said flutes forming wall sections alternating between two planar surfaces and web sections transversely spanning the spacing therebetween whereby the peripheral outer edges of the wall sections in one plane are adapted to support said tie straps on one side of a saw chain entrained on said sprocket and the peripheral outer edges of the wall sections in the other plane are adapted to support said tie straps on the other side of the saw chain, and with the transverse web sections adapted to drivingly engage the drive tangs of the center links of the saw chain.

2. A drive sprocket as defined in claim 1 including independent support means inserted in the central opening of the fluted metal band to provide a bearing surface adapted for mounting the sprocket to the drive shaft of a chain saw.

* * * * *